(12) United States Patent
Sekine

(10) Patent No.: US 11,203,111 B2
(45) Date of Patent: Dec. 21, 2021

(54) ROBOT ARM HAVING A LIQUID EXHAUST HOLE

(71) Applicant: Seiko Epson Corporation, Tokyo (JP)

(72) Inventor: Kotaro Sekine, Azumino (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/911,491

(22) Filed: Jun. 25, 2020

(65) Prior Publication Data

US 2020/0406450 A1 Dec. 31, 2020

(30) Foreign Application Priority Data

Jun. 27, 2019 (JP) ............................. JP2019-119691

(51) Int. Cl.
*B25J 9/00* (2006.01)

(52) U.S. Cl.
CPC .................................. *B25J 9/0009* (2013.01)

(58) Field of Classification Search
CPC ........ B25J 18/00; B25J 9/0009; B25J 9/0012; B25J 9/08; B25J 19/0066; B25J 19/0075
USPC .......................................... 74/490.01, 490.05
See application file for complete search history.

(56) References Cited

U.S. PATENT DOCUMENTS

| | | | | |
|---|---|---|---|---|
| 4,529,460 A * | 7/1985 | Hasegawa | ................ | B21J 13/10 156/253 |
| 10,933,540 B2 * | 3/2021 | Nakayama | ............. | B25J 9/0009 |
| 2010/0224023 A1 * | 9/2010 | Long | ........................ | B25J 18/00 74/490.05 |
| 2010/0304097 A1 * | 12/2010 | Nokleby | ................. | B29C 70/32 428/195.1 |
| 2012/0292931 A1 | 11/2012 | Mizoguchi et al. | | |
| 2015/0273701 A1 * | 10/2015 | Ting | ........................ | B25J 18/00 74/519 |
| 2015/0273702 A1 * | 10/2015 | Ting | ...................... | B25J 9/0009 74/490.01 |
| 2015/0343630 A1 * | 12/2015 | Tashiro | .................... | B25J 9/042 414/222.08 |
| 2018/0147734 A1 * | 5/2018 | Nakayama | ............. | B25J 9/0012 |

FOREIGN PATENT DOCUMENTS

| | | | | |
|---|---|---|---|---|
| DE | 102017004432 A1 * | 11/2018 | ............ | B25J 9/1045 |
| JP | H08-290385 A | 11/1996 | | |
| JP | 2007-262904 A | 10/2007 | | |
| JP | 2012-240585 A | 12/2012 | | |

* cited by examiner

*Primary Examiner* — Jake Cook
*Assistant Examiner* — T. Scott Fix
(74) *Attorney, Agent, or Firm* — Harness, Dickey & Pierce, P.L.C.

(57) ABSTRACT

A robot includes a base, a first arm coupled to the base and rotating about a first rotation axis, and a second arm coupled to the first arm and rotating about a second rotation axis, wherein the first arm has a first portion coupled to the base, a second portion coupled to the second arm, and a third portion located between the first portion and the second portion and having an internal space, and a liquid exhaust hole communicating between the internal space and an outside of the first arm and exhausting a liquid entering the internal space to the outside of the first arm is provided in the third portion.

9 Claims, 7 Drawing Sheets

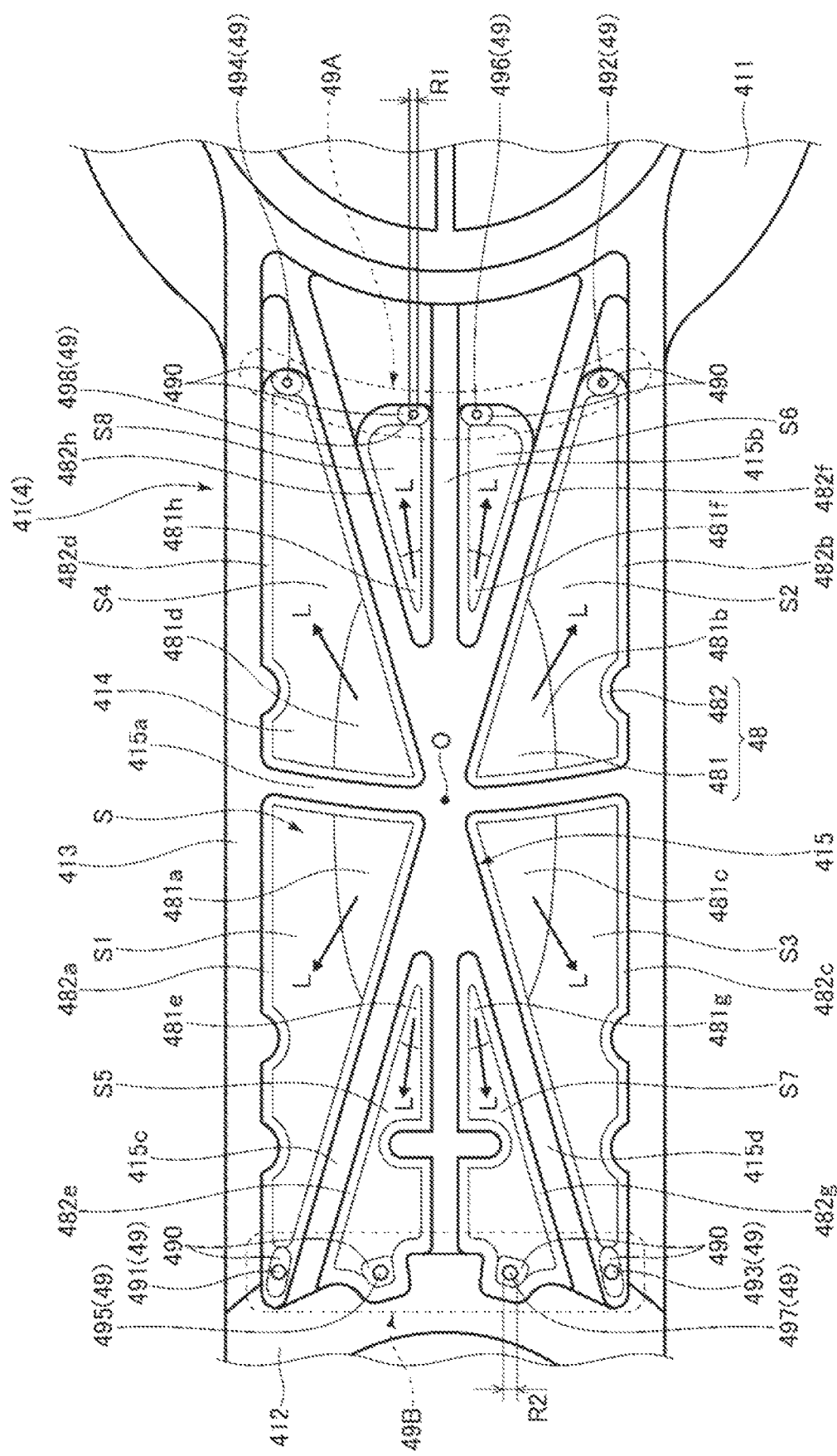

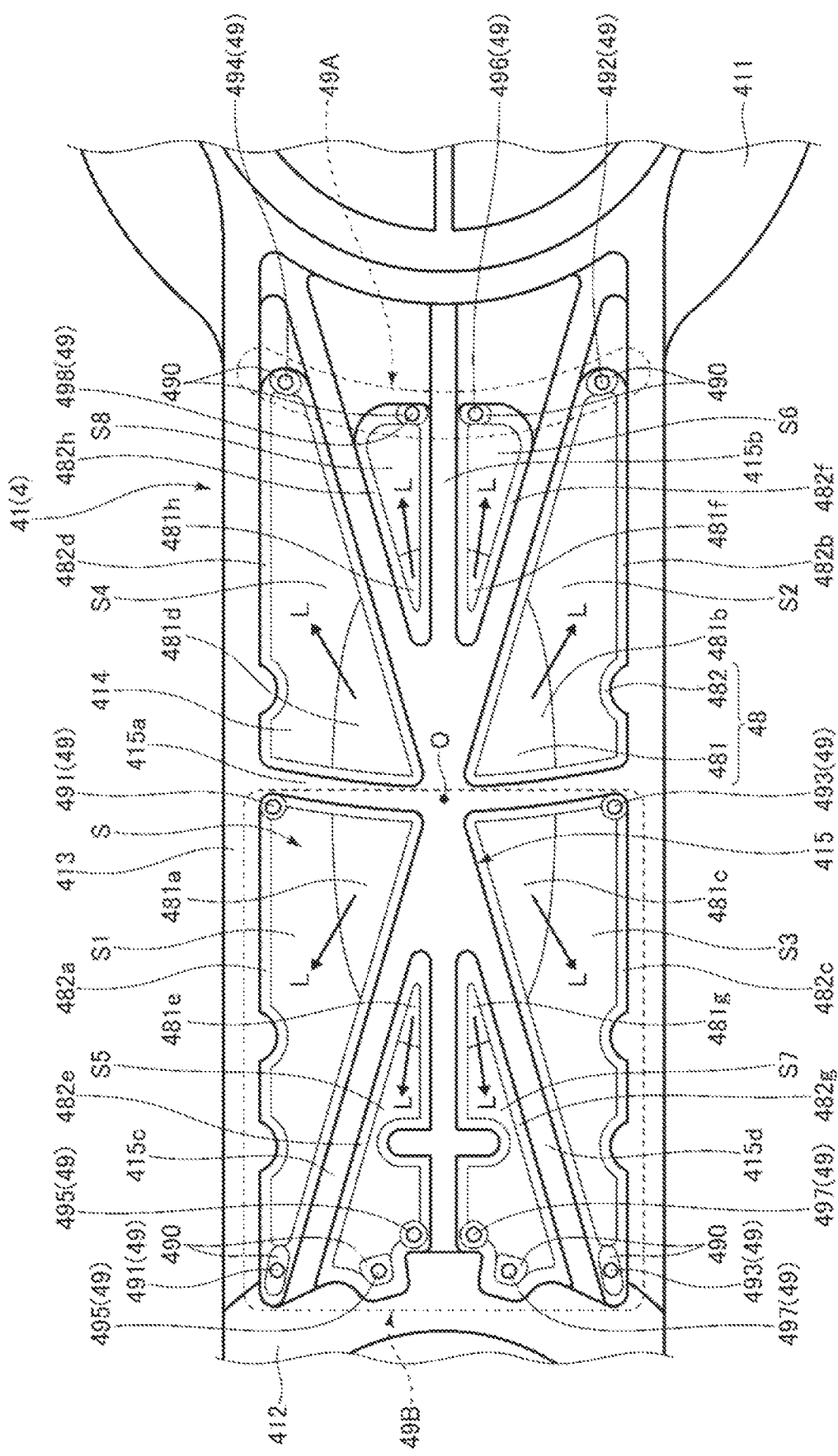

ROBOT ARM HAVING A LIQUID EXHAUST HOLE

The present application is based on, and claims priority from JP Application Serial Number 2019-119691, filed Jun. 27, 2019, the disclosure of which is hereby incorporated by reference herein in its entirety.

BACKGROUND

1. Technical Field

The present disclosure relates to a robot.

2. Related Art

JP-A-8-290385 discloses an arm for industrial robot having a hollow internal structure for weight reduction.

However, when water enters the arm disclosed in JP-A-8-290385, the water is not exhausted to the outside, but accumulated inside and may cause e.g. degradation of the arm, failure in electrical system, or the like.

SUMMARY

A robot according to an aspect of the present disclosure includes a base, a first arm coupled to the base and rotating about a first rotation axis, and a second arm coupled to the first arm and rotating about a second rotation axis, wherein the first arm has a first portion coupled to the base, a second portion coupled to the second arm, and a third portion located between the first portion and the second portion and having an internal space, and a liquid exhaust hole communicating between the internal space and an outside of the first arm and exhausting a liquid entering the internal space to the outside of the first arm is provided in the third portion.

BRIEF DESCRIPTION OF THE DRAWINGS

FIG. 6 is a plan view showing a first arm of a robot according to a second embodiment of the present disclosure.

FIG. 7 is a plan view showing a first arm of a robot according to a third embodiment of the present disclosure.

DESCRIPTION OF EXEMPLARY EMBODIMENTS

As below, a robot of the present disclosure will be explained in detail based on embodiments shown in the accompanying drawings.

First Embodiment

Figure 1:
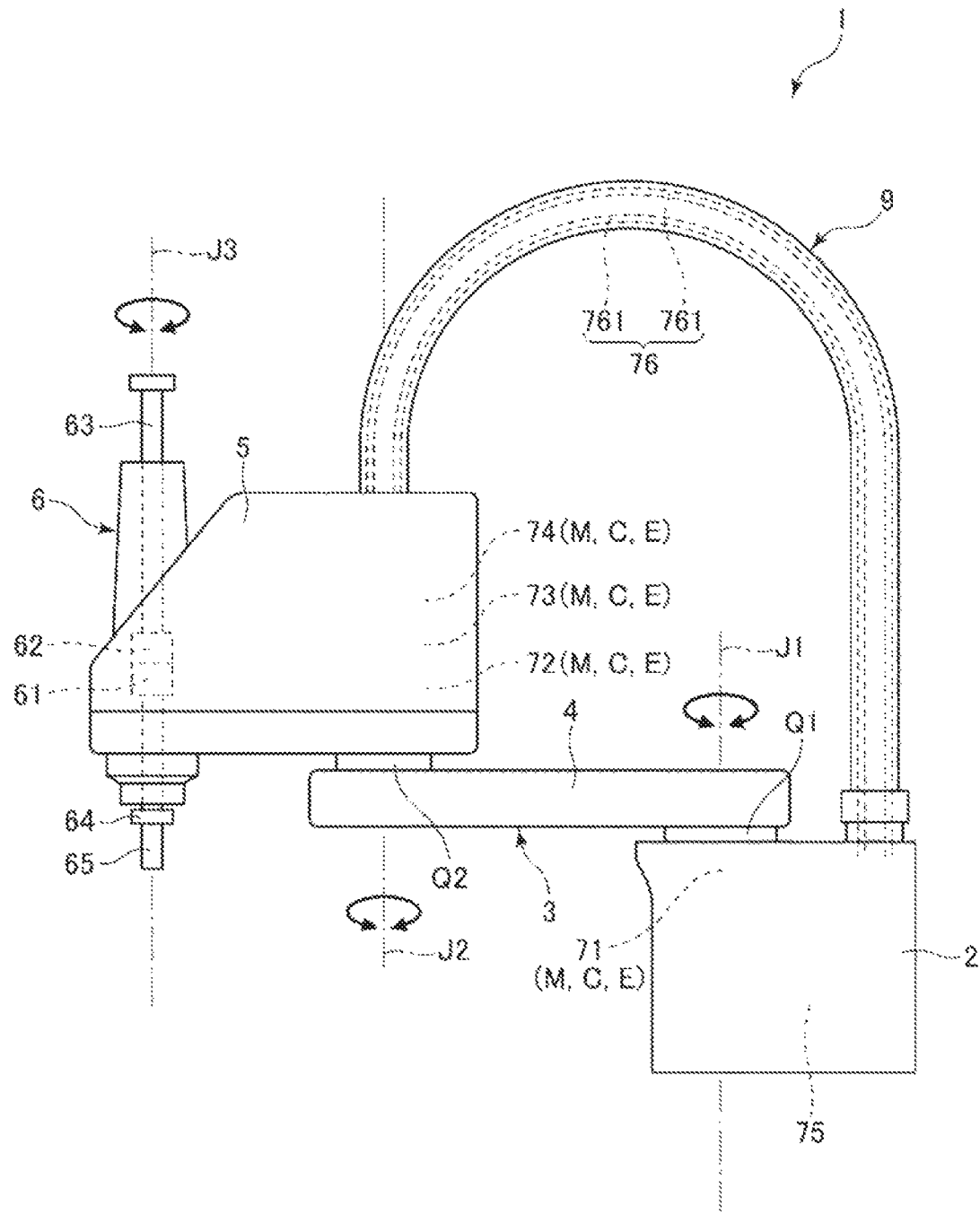
FIG. 1 is a side view showing a robot according to a first embodiment of the present disclosure.
Figure 2:
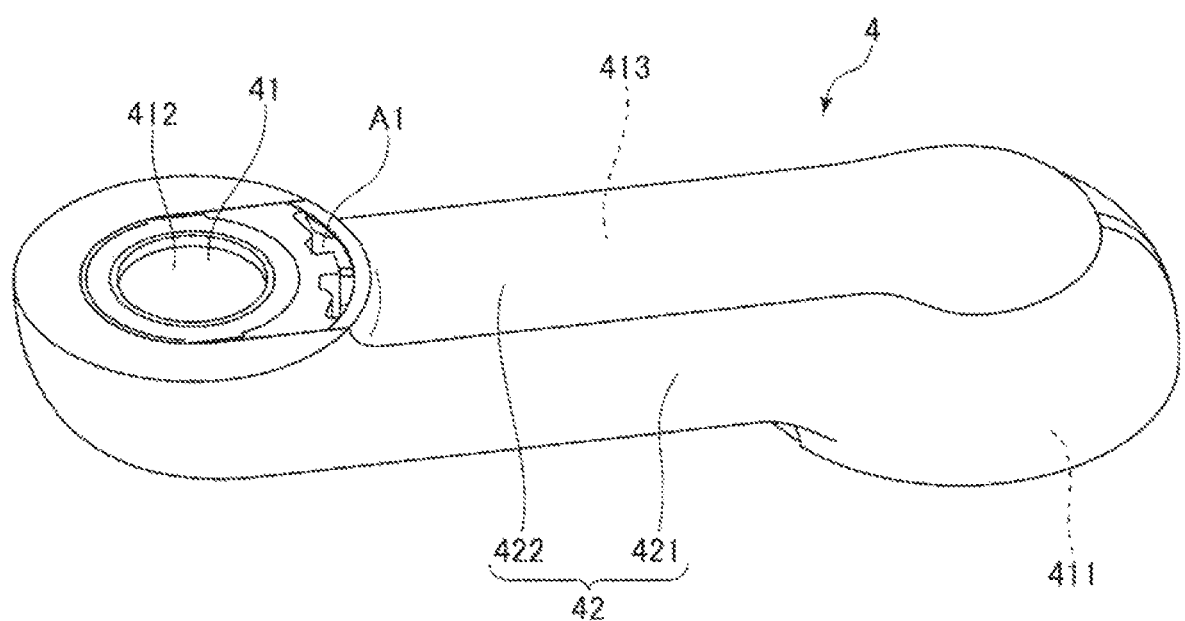
FIG. 2 is a perspective view showing a first arm of the robot in FIG. 1.
Figure 3:
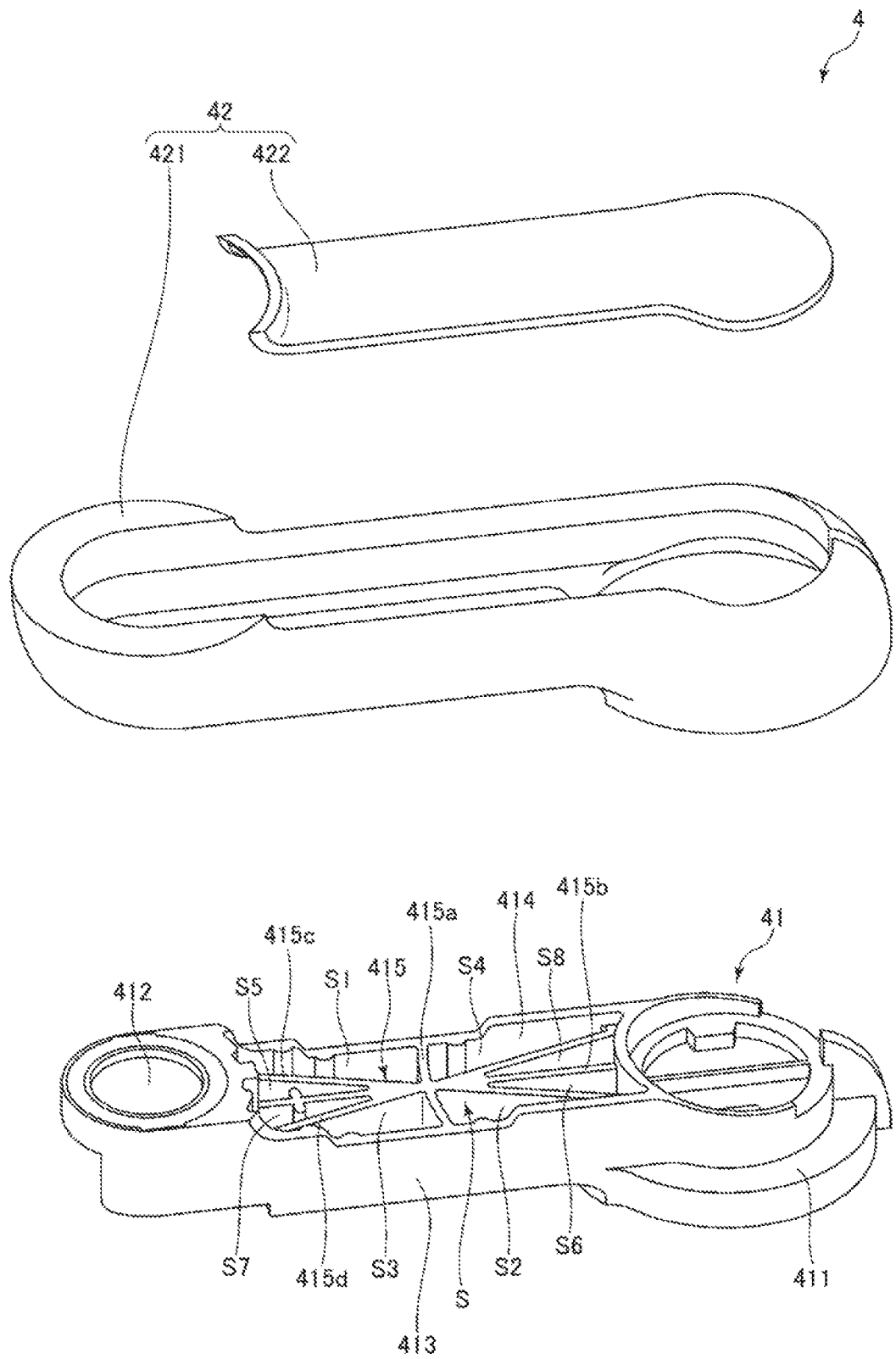
FIG. 3 is an exploded perspective view showing a second arm.
Figure 4:
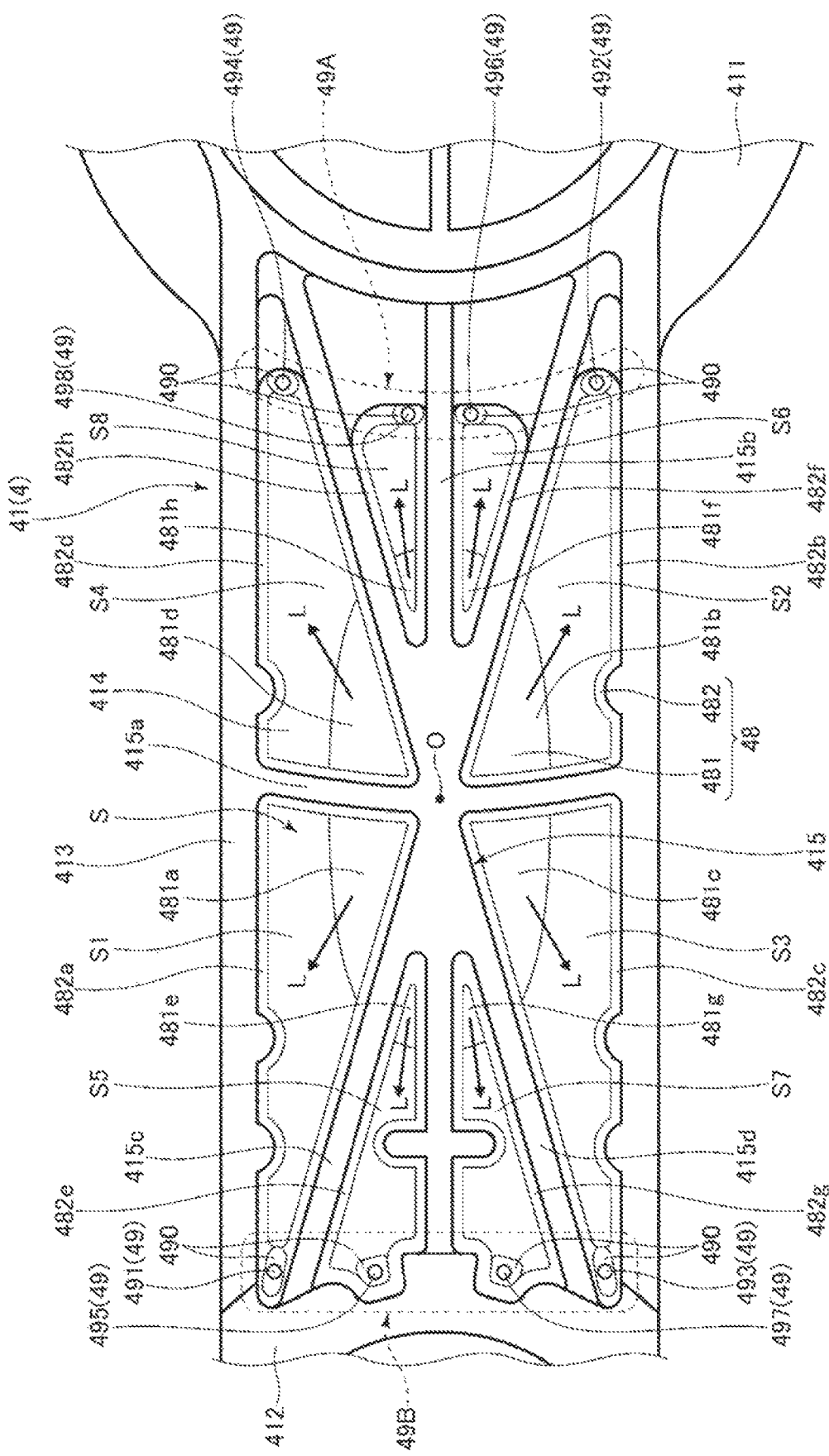
FIG. 4 is a plan view showing the first arm.
Figure 5:
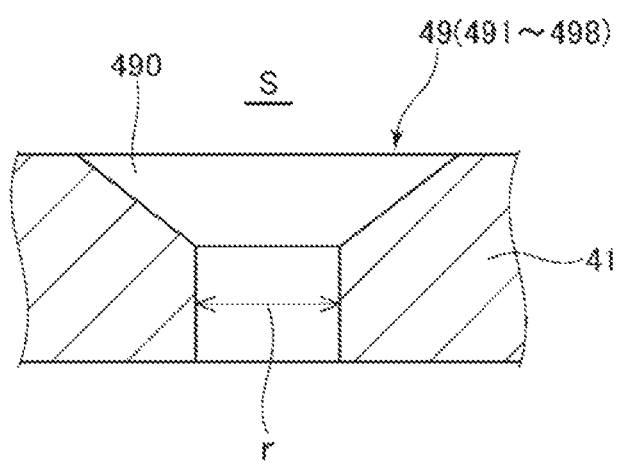
FIG. 5 is a sectional view showing the first arm.

FIG. 1 is the side view showing the robot according to the first embodiment of the present disclosure. FIG. 2 is the perspective view showing the first arm of the robot in FIG. 1. FIG. 3 is the exploded perspective view showing the second arm. FIG. 4 is the plan view showing the first arm. FIG. 5 is the sectional view showing the first arm.

Note that upward and downward directions in FIG. 1 coincide with vertical directions and the upside in FIG. is also referred to as "upper", the downside is also referred to as "lower", the right side is also referred to as "proximal end" or "proximal end portion", and the left side is also referred to as "distal end" or "distal end portion". Further, in this specification, "horizontal" refers to not only the case that coincides with horizontal but also the cases with inclinations relative to horizontal as long as effects of the present disclosure may be exerted. Similarly, in this specification, "vertical" refers to not only the case that coincides with vertical but also the cases with inclinations relative to vertical as long as the effects of the present disclosure may be exerted. Furthermore, in this specification, "parallel" refers to not only the case where two objects are parallel but also the cases with inclinations relative to parallel as long as the effects of the present disclosure may be exerted.

A robot 1 shown in FIG. 1 is a horizontal articulated robot (scalar robot) and used for respective work of e.g. holding, transport, assembly, inspection, etc. of works including electronic components. Note that the usage of the robot 1 is not particularly limited.

The robot 1 has a base 2, an arm 3 coupled to the base 2, and a pipe 9 coupling the base 2 and the arm 3. The arm 3 has a first arm 4 with a proximal end portion coupled to the base 2 and being rotatable about a first rotation axis J1 relative to the base 2, and a second arm 5 with a proximal end portion coupled to a distal end portion of the first arm 4 and being rotatable about a second rotation axis J2 parallel to the first rotation axis J1 relative to the first arm 4. Further, a working head 6 is provided in a distal end portion of the second arm 5. The first rotation axis J1 and the second rotation axis J2 are respectively along the vertical directions.

The base 2 is fixed to e.g. a floor surface (not shown) by bolts or the like. Within the base 2, a driver 71 that rotates the first arm 4 about the first rotation axis J1 relative to the base 2 is provided and, within the second arm 5, a driver 72 that rotations the second arm 5 about the second rotation axis J2 relative to the first arm is provided. The drivers 71, 72 respectively include motors M as drive sources, controllers C that control driving of the motors M, encoders E that detect amounts of rotation of the motors M, etc.

The working head 6 has a spline nut 61 and a ball screw nut 62 coaxially placed in the distal end portion of the second arm 5, and a spline shaft 63 inserted through the spline nut 61 and the ball screw nut 62. The spline shaft 63 is rotatable about a third rotation axis J3 as a center axis thereof relative to the second arm 5 and and movable upward and downward in directions along the third rotation axis J3. The third rotation axis J3 is parallel to the first rotation axis J1 and the second rotation axis J2 and along the vertical directions.

Within the second arm 5, a driver 73 that rotates the spline shaft 63 about the third rotation axis J3 by rotating the spline nut 61, and a driver 74 that moves the spline shaft 63 upward and downward in the directions along the third rotation axis J3 by rotating the ball screw nut 62 are provided. The drivers 73, 74 respectively include motors M as drive sources, controllers C that control driving of the motors M, encoders E that detect amounts of rotation of the motors M, etc.

A payload 64 for attachment of an end effector 65 is provided in the lower end portion of the spline shaft 63. The end effector 65 attached to the payload 64 is not particularly limited to, but includes e.g. a hand holding an object and a working tool processing an object.

Within the base 2, a robot control apparatus 75 that controls driving of the drivers 71, 72, 73, 74 based on commands from a host computer (not shown) is provided. Further, a group of wires 76 having a plurality of wires 761 electrically coupling the robot control apparatus 75 and the drivers 72, 73, 74 are routed from the base 2 to the second arm 5 through the pipe 9. Thereby, routing via a joint Q1 coupling the base 2 and the first arm 4 or a joint Q2 coupling the first arm 4 and the second arm 5 is unnecessary, and routing of the group of wires 76 is easier.

The robot control apparatus 75 includes e.g. a computer having a processor (CPU) that processes information, a memory communicably connected to the processor, and an external interface. Further, various programs executable by the processor are stored in the memory and the processor may read and execute various programs stored in the memory etc.

As above, the overall configuration of the robot 1 is briefly explained. Note that the configuration of the robot 1 is not particularly limited. For example, at least another arm rotatable about an axis extending in the vertical directions may intervene between the first arm 4 and the second arm 5.

Next, the first arm 4 is explained in detail. As shown in FIGS. 2 and 3, the first arm 4 has a housing 41 coupled to the base 2 in the proximal end portion and coupled to the second arm 5 in the distal end portion, and a cover 42 covering the housing 41. The cover 42 has a first cover 421 covering the side of the housing 41 and a second cover 422 covering the upside of the housing 41. The side and the upside of the housing 41 are covered by the cover 42, and the downside is not covered by the cover 42, but exposed to the outside of the first arm 4. That is, the bottom surface as a lower surface of the housing 41 is exposed to the outside of the first arm 4 from the cover 42.

Further, as shown in FIG. 3, the housing 41 has a first portion 411 located at the proximal end side and coupled to the base 2, a second portion 412 located at the distal end side and coupled to the second arm 5, and a third portion 413 located between the first portion 411 and the second portion 412. In the third portion 413, a recessed part 414 opening in the upper surface of the housing 41 is formed. That is, the recessed part 414 is formed by the side surface of the housing 41 and the bottom surface of the housing 41. Thereby, the housing 41 may be hollowed out and the weight of the first arm 4 may be reduced. An internal space S surrounded by the housing 41 and the cover 42 is formed within the first arm 4.

Furthermore, the housing 41 has a rib 415 provided within the recessed part 414. The strength of the housing 41 may be increased by the rib 415. That is, the strength of the housing 41 lowered due to the formation of the recessed part 414 and the weight reduction of the first arm 4 may be reinforced by the rib 415. The rib 415 is a wall stood from the bottom surface of the recessed part 414 and, in the embodiment, has a first rib 415a that divides the recessed part 414 in the substantially rectangular shape into two pieces in a direction of the length of the first arm 4, a second rib 415b that divides the recessed part 414 into two pieces in a direction of the width of the first arm 4, a third rib 415c that divides the recessed part 414 into two pieces on one diagonal line, and a fourth rib 415d that divides the recessed part 414 into two pieces on the other diagonal line. These first to fourth ribs 415a to 415d cross each other in the center portion of the recessed part 414.

By the rib 415, the interior of the recessed part 414, i.e., the internal space S is partitioned into a plurality of spaces. Specifically, the internal space S has a first space S1 and a second space S2 partitioned by the first rib 415a and the third rib 415c, a third space S3 and a fourth space S4 partitioned by the first rib 415a and the fourth rib 415d, a fifth space S5 and a sixth space S6 partitioned by the second rib 415b and the third rib 415c, and a seventh space S7 and an eighth space S8 partitioned by the second rib 415b and the fourth rib 415d.

Note that the configuration of the rib 415 is not particularly limited. For example, one, two, or three of the first to fourth ribs 415a to 415d may be omitted, or one or more ribs may be added. The shapes, postures, etc. of the first to fourth ribs 415a to 415d are not particularly limited. Or, the rib 415 may be omitted.

As shown in FIG. 4, in the third portion 413 of the housing 41, liquid exhaust holes 49 communicating between the internal space S and the outside of the first arm 4 and exhausting a liquid L from the internal space S to the outside of the first arm 4 are provided. For example, depending on the usage environment of the robot 1, a sprinkler may be placed around and water, i.e., a fire extinguishing liquid injected from the sprinkler may enter the first arm 4 from a gap A1 between the housing 41 and the cover 42 and be accumulated in the internal space S. When a liquid e.g. an oil is used in the work by the robot 1 or a liquid is transported, the liquid L may be accumulated in the internal space S.

As described above, when the liquid L is accumulated in the internal space S, corrosion and degradation of the first arm 4 and various components mounted on the first arm 4 may be caused. Accordingly, the liquid exhaust holes 49 are provided in the third portion 413 as a main part of the first arm 4, the liquid L within the internal space S is exhausted via the liquid exhaust holes 49, and thereby, the possibility that the above described problems occur is sufficiently lower. Therefore, the more reliable robot 1 may be obtained.

The liquid exhaust holes 49 are formed in the bottom part as the lower part in the vertical direction of the third portion 413, particularly, in the bottom portion of the recessed part 414. More specifically, the liquid exhaust holes 49 penetrate the bottom surface of the housing and the bottom surface of the recessed part 414, the lower ends thereof open in the bottom surface of the housing 41 and the upper ends thereof open in the bottom surface of the recessed part 414. As described above, the liquid exhaust holes 49 are formed in the bottom portion of the recessed part 414, and thereby, the liquid L may be exhausted from the liquid exhaust holes 49 to the outside of the first arm 4 using its own weight. Accordingly, the liquid L within the internal space S may be exhausted via the liquid exhaust holes 49 to the outside of the first arm 4 more reliably by the simpler configuration.

A plurality of the liquid exhaust holes 49 are provided. Thereby, even when the liquid L enters the internal space S, the liquid L may be exhausted to the outside of the first arm 4 more efficiently. Particularly, in the embodiment, the liquid exhaust hole 49 is provided in each of the first to eighth spaces S1 to S8 formed by partitioning of the internal space S. Specifically, the plurality of the liquid exhaust holes 49 include a liquid exhaust hole 491 communicating between the first space S1 and the outside of the first arm 4, a liquid exhaust hole 492 communicating between the second space S2 and the outside of the first arm 4, a liquid exhaust hole 493 communicating between the third space S3 and the outside of the first arm 4, a liquid exhaust hole 494 communicating between the fourth space S4 and the outside of the first arm 4, a liquid exhaust hole 495 communicating between the fifth space S5 and the outside of the first arm 4, a liquid exhaust hole 496 communicating between the sixth space S6 and the outside of the first arm 4, a liquid exhaust hole 497 communicating between the seventh space S7 and the outside of the first arm 4, and a liquid exhaust hole 498 communicating between the eighth space S8 and the outside of the first arm 4. The respective spaces S1 to S8 are partitioned by the rib 415 and the liquid exhaust holes 491 to 498 are formed in the respective spaces S1 to S8, and thereby, the liquid L within the internal space S may be exhausted via these liquid exhaust holes 491 to 498 to the outside of the first arm 4 more reliably.

Note that, in the embodiment, the single liquid exhaust hole 49 is provided with respect to each of the first to eighth spaces S1 to S8 and the number of liquid exhaust holes 49 with respect to each of the first to eighth spaces S1 to S8 is not particularly limited. The number may be two or more. Or, the numbers of liquid exhaust holes 49 may be different among the first to eighth spaces S1 to S8.

Of the liquid exhaust holes 491 to 498, the liquid exhaust holes 492, 494, 496, 498 as first liquid exhaust holes 49A provided in the second, fourth, sixth, eighth spaces S2, S4, S6, S8 located at the proximal end side within the internal space S are respectively unevenly distributed at the first portion 411 side, i.e., the base 2 side. That is, the liquid exhaust holes 492, 494, 496, 498 are respectively provided so that separation distances from the proximal end of the internal space S may be shorter than separation distances from a center O in a plan view from the upside in the vertical direction.

On the other hand, of the liquid exhaust holes 491 to 498, the liquid exhaust holes 491, 493, 495, 497 as second liquid exhaust holes 49B provided in the first, third, fifth, seventh spaces S1, S3, S5, S7 located at the distal end side within the internal space S are respectively unevenly distributed at the second portion 412 side, i.e., the second arm 5 side. That is, the liquid exhaust holes 491, 493, 495, 497 are respectively provided so that separation distances from the distal end of the internal space S may be shorter than separation distances from the center O in the plan view from the upside in the vertical direction.

As described above, the liquid exhaust holes 491 to 498 are unevenly distributed at the first portion 411 side and the second portion 412 side, and thereby, the liquid exhaust holes 491 to 498 may be dispersedly placed within the internal space S. Accordingly, the liquid L within the internal space S may be exhausted via the liquid exhaust holes 491 to 498 to the outside of the first arm 4 more reliably and more effectively.

The entry of the liquid L into the first arm 4 is mainly from the portion in which the housing 41 is exposed from the cover 42 and, in the embodiment, the coupling portion of the first portion 411 to the base 2 and the coupling portion of the second portion 412 to the second arm 5. Accordingly, the liquid exhaust holes 492, 494, 496, 498 are unevenly distributed at the first portion 411 side, and thereby, the liquid L entering the first arm 4 from the first portion 411 may be quickly and efficiently exhausted to the outside of the first arm 4. The liquid exhaust holes 491, 493, 495, 497 are unevenly distributed at the second portion 412 side, and thereby, the liquid L entering the first arm 4 from the second portion 412 may be quickly and efficiently exhausted to the outside of the first arm 4. Further, a region in which none of the liquid exhaust holes 491 to 498 is formed may be secured in the center part of the internal space S, i.e., near the center O, and a guide part 48, which will be described later, may be easily provided in the portion.

As shown in FIGS. 4 and 5, the respective liquid exhaust holes 49 (491 to 498) penetrate the bottom part of the housing 41 in the thickness directions and the upper end portions are funnel-shaped or tapered. That is, the respective liquid exhaust holes 49 have tapered portions 490 with inner diameters to be smaller from the upside toward the downside, i.e., from the internal space S toward the outside of the first arm 4 at the upper end portions thereof the internal space S side. Thereby, the liquid L within the internal space S may be easily led into the liquid exhaust holes 49 and the liquid L within the internal space S may be efficiently exhausted via the liquid exhaust holes 49 to the outside of the first arm 4. The lower end portions of the respective liquid exhaust holes 49 (491 to 498) have inner diameters r constant in the thickness directions. The inner diameters r of the liquid exhaust holes 49 are not particularly limited, but preferably from 2 mm to 20 mm and more preferably from 5 mm to 10 mm, for example. Thereby, the respective liquid exhaust holes 49 have suitable sizes for exhausting the liquid L. Note that, unlike the illustrated configuration, the tapered portions 490 may be provided in the whole liquid exhaust holes 49.

Further, as shown in FIG. 4, the guide part 48 for guiding the liquid L within the internal space S to the liquid exhaust holes 491 to 498 is provided in the housing 41. That is, the guide part 48 is provided in the third portion 413. The guide part 48 is provided, and thereby, the liquid L within the internal space S may be exhausted via the liquid exhaust holes 491 to 498 to the outside of the first arm 4.

The guide part 48 has convex portions 481 projecting in dome shapes from the bottom surface of the recessed part 414 into the internal space S, and grooves 482 provided in the bottom surface of the recessed part 414.

The convex portions 481 are located in the center portion of the recessed part 414, i.e., near the center O and provided to overlap with the respective first to eighth spaces S1 to S8 in the plan view from the upside in the vertical direction. That is, the convex portions 481 are provided in the respective first to eighth spaces S1 to S8. Further, the liquid exhaust holes 491 to 498 are placed around the convex portions 481.

Accordingly, an inclined surface 481a of the convex portion 481 is inclined toward the liquid exhaust hole 491 within the first space S1, and the liquid L entering the first space S1 is guided by the inclined surface 481a, flows toward the liquid exhaust hole 491, and is efficiently exhausted from the liquid exhaust hole 491. Similarly, an inclined surface 481b of the convex portion 481 is inclined toward the liquid exhaust hole 492 within the second space S2, and the liquid L entering the second space S2 is guided by the inclined surface 481b, flows toward the liquid exhaust hole 492, and is efficiently exhausted from the liquid exhaust hole 492. Further, an inclined surface 481c of the convex portion 481 is inclined toward the liquid exhaust hole 493 within the third space S3, and the liquid L entering the third space S3 is guided by the inclined surface 481c, flows toward the liquid exhaust hole 493, and is efficiently exhausted from the liquid exhaust hole 493. Furthermore, an inclined surface 481d of the convex portion 481 is inclined toward the liquid exhaust hole 494 within the fourth space S4, and the liquid L entering the fourth space S4 is guided by the inclined surface 481d, flows toward the liquid exhaust hole 494, and is efficiently exhausted from the liquid exhaust hole 494.

An inclined surface 481e of the convex portion 481 is inclined toward the liquid exhaust hole 495 within the fifth space S5, and the liquid L entering the fifth space S5 is guided by the inclined surface 481e, flows toward the liquid exhaust hole 495, and is efficiently exhausted from the liquid exhaust hole 495. Further, an inclined surface 481f of the convex portion 481 is inclined toward the liquid exhaust hole 496 within the sixth space S6, and the liquid L entering the sixth space S6 is guided by the inclined surface 481f, flows toward the liquid exhaust hole 496, and is efficiently exhausted from the liquid exhaust hole 496. Furthermore, an inclined surface 481g of the convex portion 481 is inclined toward the liquid exhaust hole 497 within the seventh space S7, and the liquid L entering the seventh space S7 is guided by the inclined surface 481g, flows toward the liquid exhaust hole 497, and is efficiently exhausted from the liquid exhaust hole 497. Moreover, an inclined surface 481h of the convex portion 481 is inclined toward the liquid exhaust hole 498 within the eighth space S8, and the liquid L entering the eighth space S8 is guided by the inclined surface 481h, flows toward the liquid exhaust hole 498, and is efficiently exhausted from the liquid exhaust hole 498.

On the other hand, the grooves 482 have a groove 482a provided within the first space S1 and leading the liquid L within the first space S1 to the liquid exhaust hole 491, a groove 482b provided within the second space S2 and leading the liquid L within the second space S2 to the liquid exhaust hole 492, a groove 482c provided within the third space S3 and leading the liquid L within the third space S3 to the liquid exhaust hole 493, a groove 482d provided within the fourth space S4 and leading the liquid L within the fourth space S4 to the liquid exhaust hole 494, a groove 482e provided within the fifth space S5 and leading the liquid L within the fifth space S5 to the liquid exhaust hole 495, a groove 482f provided within the sixth space S6 and leading the liquid L within the sixth space S6 to the liquid exhaust hole 496, a groove 482g provided within the seventh space S7 and leading the liquid L within the seventh space S7 to the liquid exhaust hole 497, and a groove 482h provided within the eighth space S8 and leading the liquid L within the eighth space S8 to the liquid exhaust hole 498. Thereby, the liquid L within the respective spaces S1 to S8 may be excluded via the liquid exhaust holes 491 to 498 to the outside of the first arm 4.

The groove 482a is formed in an annular shape along the wall partitioning the first space S1 and the liquid exhaust hole 491 is provided in the middle thereof. Accordingly, the liquid L entering the first space S1 may be efficiently collected in the groove 482a and the collected liquid L may be effectively exhausted via the liquid exhaust hole 491 to the outside of the first arm 4.

Similarly, the groove 482b is formed in an annular shape along the wall partitioning the second space S2 and the liquid exhaust hole 492 is provided in the middle thereof. The groove 482c is formed in an annular shape along the wall partitioning the third space S3 and the liquid exhaust hole 493 is provided in the middle thereof. The groove 482d is formed in an annular shape along the wall partitioning the fourth space S4 and the liquid exhaust hole 494 is provided in the middle thereof. The groove 482e is formed in an annular shape along the wall partitioning the fifth space S5 and the liquid exhaust hole 495 is provided in the middle thereof. The groove 482f is formed in an annular shape along the wall partitioning the sixth space S6 and the liquid exhaust hole 496 is provided in the middle thereof. The groove 482g is formed in an annular shape along the wall partitioning the seventh space S7 and the liquid exhaust hole 497 is provided in the middle thereof. The groove 482h is formed in an annular shape along the wall partitioning the eighth space S8 and the liquid exhaust hole 498 is provided in the middle thereof.

Note that the configuration of the guide part 48 is not particularly limited as long as the guide part may guide the liquid L within the internal space S to the liquid exhaust holes 491 to 498. For example, one of the convex portion 481 and the groove 482 may be omitted or the guide part 48 may be omitted.

As above, the robot 1 is explained in detail. As described above, the robot 1 includes the base 2, the first arm 4 coupled to the base 2 and rotating about the first rotation axis J1, and the second arm 5 coupled to the first arm 4 and rotating about the second rotation axis J2, and the first arm 4 has the first portion 411 coupled to the base 2, the second portion 412 coupled to the second arm 5, and the third portion 413 located between the first portion 411 and the second portion 412 and having the internal space S. Further, in the third portion 413, the liquid exhaust holes 49 communicating between the internal space S and the outside of the first arm 4 and exhausting the liquid L entering the internal space S to the outside of the first arm 4 are provided. As described above, the internal space S is formed within the first arm 4, and thereby, the weight of the first arm 4 may be reduced. Further, with the liquid exhaust holes 49, the liquid L entering the first arm 4 may be exhausted to the outside of the first arm 4 and degradation and driving failure of the first arm 4 due to the liquid L may be effectively suppressed.

Further, as described above, the first rotation axis J1 and the second rotation axis J2 are respectively along the vertical directions and the liquid exhaust holes 49 are provided in the bottom part of the third portion 413. Thereby, the liquid L is exhausted from the liquid exhaust holes 49 to the outside of the first arm 4 under its own weight.

As described above, the third portion 413 has the rib 415 as the partitioning part that partitions the internal space S into the plurality of the first to eighth spaces S1 to S8. Further, the liquid exhaust hole 49 is provided with respect to each of the plurality of the first to eighth spaces S1 to S8. The rib 415 is provided, and thereby, the first arm 4 may be reinforced. The liquid exhaust hole 49 is provided with respect to each of the plurality of the first to eighth spaces S1 to S8, and thereby, the liquid L may be exhausted from the respective first to eighth spaces S1 to S8 via the liquid exhaust holes 49 more reliably.

As described above, the third portion 413 has the guide part 48 that guides the liquid L to the liquid exhaust holes 49. Thereby, the liquid L within the internal space S may be efficiently exhausted via the liquid exhaust holes 49 to the outside of the first arm 4.

As described above, the guide part 48 has the inclined surfaces 481a to 481h inclined toward the liquid exhaust holes 49. Thereby, the guide part 48 having the simpler configuration may be obtained.

As described above, the guide part 48 has the grooves 482 leading the liquid L to the liquid exhaust holes 49. Thereby, the guide part 48 having the simpler configuration may be obtained.

As described above, the liquid exhaust holes 49 are unevenly distributed at the first portion 411 side or the second portion 412 side in the third portion 413. Particularly, in the embodiment, the liquid exhaust holes have the first liquid exhaust holes 49A unevenly distributed at the first portion 411 side and the second liquid exhaust holes 49B unevenly distributed at the second portion 412 side. The first liquid exhaust holes 49A unevenly distributed at the first portion 411 side are provided, and thereby, the liquid L entering the first arm 4 from the first portion 411 may be quickly and efficiently exhausted via the first liquid exhaust holes 49A to the outside of the first arm 4. The second liquid exhaust holes 49B unevenly distributed at the second portion 412 side are provided, and thereby, the liquid L entering the first arm 4 from the second portion 412 may be quickly and efficiently exhausted via the second liquid exhaust holes 49B to the outside of the first arm 4.

As described above, the liquid exhaust holes 49 have the tapered portions 490 with the inner diameters to be smaller from the internal space S toward the outside at the internal space S side. Thereby, the liquid L within the internal space S may be easily led into the liquid exhaust holes 49 and the liquid L within the internal space S may be efficiently exhausted via the liquid exhaust holes 49 to the outside of the first arm 4.

Note that, in the present disclosure, conditions including the shapes, placements, and dimensions of the liquid exhaust holes 49 and the guide part 48 are not limited to those described as above.

Second Embodiment

FIG. 6 is the plan view showing the first arm of the robot according to the second embodiment of the present disclosure.

The robot 1 according to the embodiment is the same as that of the above described first embodiment except that the configurations of the liquid exhaust holes 49 are different. In the following description, the robot 1 of the second embodiment will be explained with a focus on the differences from the above described first embodiment and the explanation of the same items will be omitted. Further, in FIG. 6, the same configurations as those of the above described first embodiment have the same signs.

As shown in FIG. 6, in the first arm 4 of the embodiment, the first liquid exhaust holes 49A and the second liquid exhaust holes 49B are different in hole size. Particularly, the second liquid exhaust holes 49B have the larger hole diameters than the first liquid exhaust holes 49A. Specifically, a diameter (inner diameter) R2 of the liquid exhaust holes 491, 493, 495, 497 as the second liquid exhaust holes 49B is larger than a diameter (inner diameter) R1 of the liquid exhaust holes 492, 494, 496, 498 as the first liquid exhaust holes 49A. That is, R2>R1. Note that the diameters R1, R2 refer to the minimum values of the diameters of the first, second liquid exhaust holes 49A, 49B, i.e., the diameters of the portions having the minimum diameters.

As described above, the entry of the liquid L into the first arm 4 is mainly from the coupling portion of the first portion 411 to the base 2 and the coupling portion of the second portion 412 to the second arm 5. Particularly, the coupling portion of the second portion 412 to the second arm 5 faces upward in the vertical direction and, on the other hand, the coupling portion of the first portion 411 to the base 2 faces downward in the vertical direction. Accordingly, the liquid L enters the inside from the coupling portion of the second portion 412 to the second arm 5 more easier than that from the coupling portion of the first portion 411 to the base 2. Therefore, R2>R1 and the exhaust efficiency of the liquid exhaust holes 491, 493, 495, 497 as the second liquid exhaust holes 49B is made higher, and thereby, the liquid L entering the internal space S may be effectively exhausted to the outside of the first arm 4. Further, excessive increase in diameter of the liquid exhaust holes 492, 494, 496, 498 as the first liquid exhaust holes 49A is suppressed and, for example, entry of foreign matter into the first arm 4 via the liquid exhaust holes 492, 494, 496, 498 may be effectively suppressed.

The relationship between R2 and R1 is not particularly limited. When the numbers of the first, second liquid exhaust holes 49A, 49B are the same, for example, $1.2 \leq R2/R1 \leq 10$ is preferable, $1.5 \leq R2/R1 \leq 5.0$ is more preferable, and $2.0 \leq R2/R1 \leq 3.0$ is even more preferable. Thereby, the above described effects become more remarkable, and reduction of the strength of the first arm 4 and entry of foreign matter into the first arm 4 via the first, second liquid exhaust holes 49A, 49B due to excessive increase of the diameter R2 may be effectively suppressed.

As described above, in the robot 1 of the embodiment, the liquid exhaust holes 49 have the first liquid exhaust holes 49A unevenly distributed at the first portion 411 side in the third portion 413 and the second liquid exhaust holes 49B unevenly distributed at the second portion 412 side in the third portion 413. Further, the diameter R2 of the second liquid exhaust holes 49B is larger than the diameter R1 of the first liquid exhaust holes 49A. Thereby, the liquid L entering the internal space S may be effectively exhausted via the liquid exhaust holes 49 to the outside of the first arm 4.

According to the second embodiment, the same effects as those of the above described first embodiment may be exerted.

Third Embodiment

FIG. 7 is the plan view showing the first arm of the robot according to the third embodiment of the present disclosure.

The robot 1 according to the embodiment is the same as that of the above described first embodiment except that the configurations of the liquid exhaust holes 49 are different. In the following description, the robot 1 of the third embodiment will be explained with a focus on the differences from the above described first embodiment and the explanation of the same items will be omitted. Further, in FIG. 7, the same configurations as those of the above described first embodiment have the same signs.

As shown in FIG. 7, in the first arm 4 of the embodiment, the number of the liquid exhaust holes 491, 493, 495, 497 as the second liquid exhaust holes 49B is larger than the number of the liquid exhaust holes 492, 494, 496, 498 as the first liquid exhaust holes 49A. In the embodiment, twos of the respective liquid exhaust holes 491, 493, 495, 497 are provided and ones of the respective liquid exhaust holes 492, 494, 496, 498 are provided. That is, the number of the second liquid exhaust holes 49B is eight and the number of the first liquid exhaust holes 49A is four. Note that the numbers of the first, second liquid exhaust holes 49A, 49B are respectively not particularly limited.

As described above, the entry of the liquid L into the first arm 4 is mainly from the coupling portion of the first portion 411 to the base 2 and the coupling portion of the second portion 412 to the second arm 5. Particularly, the coupling portion of the second portion 412 to the second arm 5 faces upward in the vertical direction and, on the other hand, the coupling portion of the first portion 411 to the base 2 faces downward in the vertical direction. Accordingly, the liquid L enters the inside from the coupling portion of the second portion 412 to the second arm 5 more easier than that from the coupling portion of the first portion 411 to the base 2. The number of the second liquid exhaust holes 49B is made larger than the number of the first liquid exhaust holes 49A and the exhaust efficiency of the liquid exhaust holes 491, 493, 495, 497 as the second liquid exhaust holes 49B is made higher, and thereby, the liquid L entering the internal space S may be effectively exhausted to the outside of the first arm 4. Further, the number of the liquid exhaust holes 492, 494, 496, 498 as the first liquid exhaust holes 49A larger than necessary is suppressed and, for example, entry of foreign matter into the first arm 4 via the liquid exhaust holes 492, 494, 496, 498 may be effectively suppressed.

When the number of second liquid exhaust holes 49B is N2 and the number of first liquid exhaust holes 49A is N1, the relationship between N1 and N2 is not particularly limited. When the diameters R2, R1 are the same, for example, $1.2 \leq N2/N1 \leq 10$ is preferable, $1.5 \leq N2/N1 \leq 5.0$ is more preferable, and $2.0 \leq N2/N1 \leq 3.0$ is even more preferable. Thereby, the above described effects become more remarkable, and reduction of the strength of the first arm 4 and entry of foreign matter into the first arm 4 via the first, second liquid exhaust holes 49A, 49B due to excessive increase of the value of N2 may be effectively suppressed.

As described above, in the robot 1 of the embodiment, the liquid exhaust holes 49 have the first liquid exhaust holes 49A unevenly distributed at the first portion 411 side in the third portion 413 and the second liquid exhaust holes 49B unevenly distributed at the second portion 412 side in the third portion 413. Further, the number N2 of the second liquid exhaust holes 49B is larger than the number N1 of the first liquid exhaust holes 49A. Thereby, the liquid L entering the internal space S may be effectively exhausted via the liquid exhaust holes 49 to the outside of the first arm 4.

According to the third embodiment, the same effects as those of the above described first embodiment may be exerted.

As above, the robot according to the present disclosure is explained based on the illustrated embodiments, however, the present disclosure is not limited to those. The configurations of the respective parts may be replaced by arbitrary configurations having the same functions. Or, another arbitrary configuration may be added. Or, the present disclosure may be a combination of arbitrary two or more configurations of the above described respective embodiments.

What is claimed is:

1. A robot comprising:
a base;
a first arm coupled to the base and rotating about a first rotation axis; and
a second arm coupled to the first arm and rotating about a second rotation axis, wherein
the first arm has a first connector coupled to the base, a second connector coupled to the second arm, and a frame segment connecting the first connector with the second connector, the frame segment including a recess defining an internal space, and
a liquid exhaust hole disposed in a bottom surface of the recess in the frame segment, the liquid exhaust hole communicating between the internal space and an outside of the first arm and exhausting a liquid entering the internal space to the outside of the first arm, the liquid exhaust hole tapering from a larger diameter on an internal space side of the frame segment to a smaller diameter on the outside of the frame segment.

2. The robot according to claim 1, wherein
the liquid exhaust hole is provided in a bottom part of the third portion.

3. The robot according to claim 1, wherein
the third portion has a partitioning part that partitions the internal space into a plurality of spaces, and
the liquid exhaust hole is provided with respect to each of the plurality of spaces.

4. The robot according to claim 1, wherein
the third portion has a guide part that guides the liquid to the liquid exhaust hole.

5. The robot according to claim 4, wherein
the guide part has an inclined surface inclined toward the liquid exhaust hole.

6. The robot according to claim 4, wherein
the guide part has a groove leading the liquid to the liquid exhaust hole.

7. The robot according to claim 1, wherein
the liquid exhaust hole is one of a plurality of liquid exhaust holes, and
the plurality of liquid exhaust holes are unevenly distributed in the first portion side or the second portion side in the third portion.

8. The robot according to claim 7, wherein
the plurality of liquid exhaust holes have first liquid exhaust holes unevenly distributed in the first portion side in the third portion and second liquid exhaust holes unevenly distributed in the second portion side in the third portion, and
a diameter of the second liquid exhaust holes is larger than a diameter of the first liquid exhaust holes.

9. The robot according to claim 7, wherein
the plurality of liquid exhaust holes have first liquid exhaust holes unevenly distributed in the first portion side in the third portion and second liquid exhaust holes unevenly distributed in the second portion side in the third portion, and
a number of the second liquid exhaust holes is larger than a number of the first liquid exhaust holes.

* * * * *